July 19, 1966 — A. M. SCIAKY ETAL — 3,262,006
WELDING CONTROL SYSTEM
Filed Dec. 27, 1963 — 2 Sheets-Sheet 1

INVENTORS
Albert M. Sciaky
Eugene P. Vilkas
BY Mueller & Aichele
Attys.

July 19, 1966 A. M. SCIAKY ETAL 3,262,006
WELDING CONTROL SYSTEM
Filed Dec. 27, 1963 2 Sheets-Sheet 2
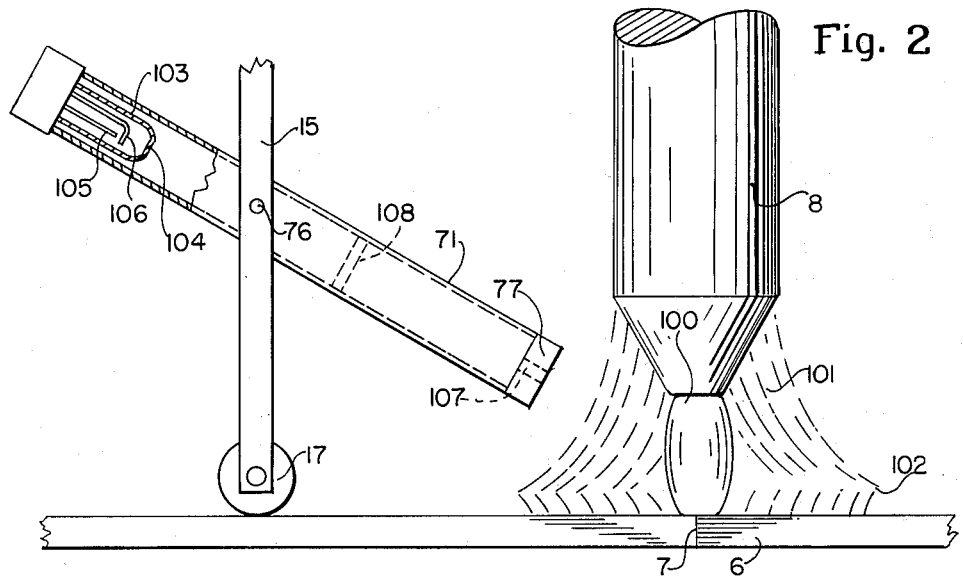
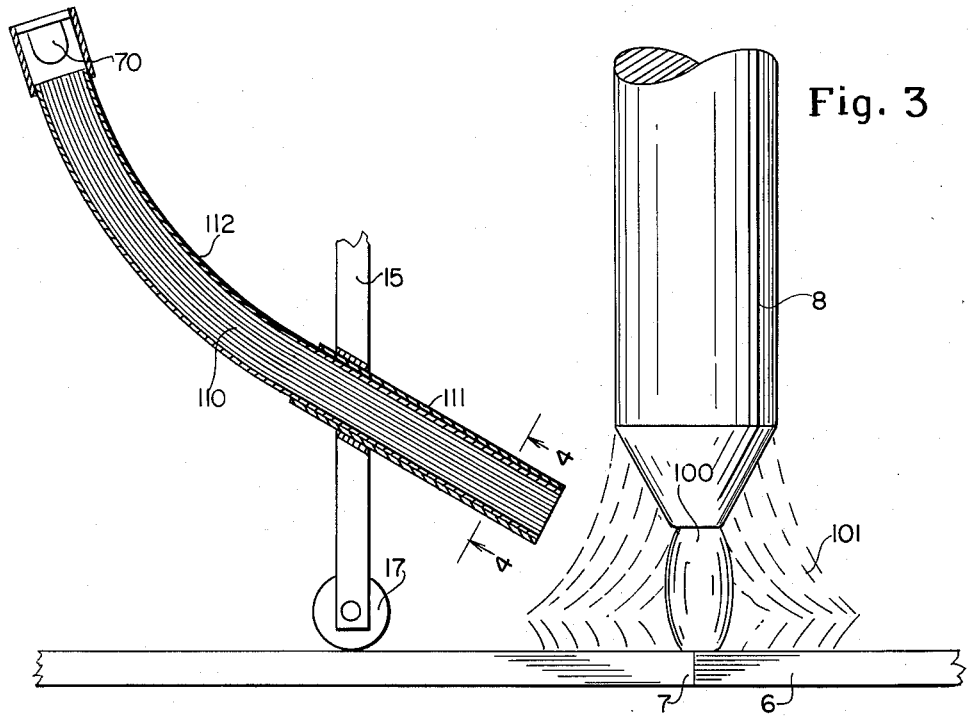
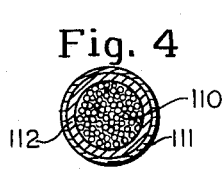
INVENTORS
Albert M. Sciaky
Eugene P. Vilkas
BY
Mueller & Aichele
Attys.

United States Patent Office 3,262,006
Patented July 19, 1966

3,262,006
WELDING CONTROL SYSTEM
Albert M. Sciaky, Palos Park, and Eugene P. Vilkas, Chicago, Ill., assignors to Welding Research, Inc., Chicago, Ill., a corporation of Illinois
Filed Dec. 27, 1963, Ser. No. 333,809
9 Claims. (Cl. 314—63)

This invention is directed to systems for providing automatic control of nonconsumable electrode arc welding equipment, and more particularly to an electronic system responsive to radiation intensity of a welding arc for controlling the position of the electrode.

In welding, it is desirable to maintain constant the distance between the welding electrode and the work piece to insure reliable welds. A work piece may be moved with respect to the welding electrode, as when welding a joint between two pieces of metal, and it is desired that the welding action be constant along the seam. Heretofore, in automatic arc welding with nonconsumable electrodes, the arc voltage between the electrode and the work piece was measured and compared with a preset reference voltage and the error, if any, was used to control the position of the electrode. This was accomplished by a motor control circuit, wherein a motor adjusted the electrode holding device toward and away from the work piece to maintain constant the arc voltage. This system was found to be unsatisfactory in precision welding with a nonconsumable tungsten electrode in the presence of an inert gas because spurious voltages appearing between the electrode holding device and the work piece produced unwanted changes in the distance between the electrode and the work piece.

It is important to recognize that the welding arc produced by tungsten inert gas welding has two concentric zones, a central plasma and a surrounding flame. The plasma constitutes the region of thermal ionization and current flow and produces ultraviolet radiation, while the surrounding flame constitutes the recombination zone wherein occurs the neutralization of positive ions. The flame produces infrared and visible light radiation. Moreover, the arc has three axial zones along the axis of the arc; the cathode region at the electrode, the plasma, and the anode region at the work piece. Each of the three zones makes a separate and distinct contribution to the total arc voltage. The voltage drop in the plasma is due to the electrical resistance of the arc column, but the origin of the voltage drops at the cathode and anode is more complex. It is known that these voltage drops increase with the heat losses to the cathode and anode in the form of escaping electrons, heat conduction toward the electrode holder device (which may be water cooled) and the holding devices for the work piece, gaseous conduction, and convection, radiation, and evaporation of anode material. This explains why variation in arc plasma length can be observed to take place when automatically controlling the electrode position to hold the arc voltage constant.

Furthermore, it is very important to note that in nonconsumable electrode welding with welding currents above 200 amperes, the concentric arc plasma zone produces the phenomenon known as papillary depression, which occurs beneath the arc plasma of an argon or helium shielded arc. The depth of arc penetration in nonconsumable electrode arc welding systems depends upon the intensity of the arc plasma but it has not been possible to control the arc to hold the plasma intensity within given limits prior to the present invention.

It is therefore an object of the present invention to provide a welding control system which automatically adjusts the position of a nonconsumable electrode with respect to the work so that constant radiation intensity is maintained to provide highly constant welding action.

A further object of the invention is to provide a welding arc radiation intensity controlling system which senses the radiation and adjusts the position of the electrode so that the amount of radiation remains fixed.

Another object of the invention is to provide a control system for positioning a welding electrode, which is initially controlled by the voltage between the electrode and the work piece, and which after a predetermined time delay is controlled by optically sensing the arc radiation intensity to maintain this within fixed limits.

It is also an object of this invention to provide a positioning system for a welding electrode wherein infrared or ultraviolet radiation intensity is sensed at a fixed distance and angle with respect to the arc to provide a constant measure of the radiation.

A feature of the invention is the provision of a control system for a welding torch having a nonconsumable electrode, including optical means positioned with respect to the work piece for sensing arc radiation intensity, and a control system for adjusting the position of the electrode so that the radiation intensity is substantially constant.

Another feature of the invention is the provision of a positioning system for a welding electrode including a photo diode with a guiding tube or flexible fiber bundle for directing infrared and visible light radiation from the welding arc thereon, and a circuit for producing a voltage which varies with the illumination of the photo diode to produce an error voltage which is applied to a control system for positioning the electrode so that the infrared radiation intensity is held substantially constant.

By the invention, the photo diode for sensing direct infrared and visible light radiation can be replaced by an ultraviolet sensor which detects ultraviolet radiation produced in arc plasma, and is substantially unaffected by infrared radiation produced by the arc flame.

Therefore, another feature of the invention is the provision of a positioning system for a welding electrode including an ultraviolet sensor with a guiding tube for directing ultraviolet radiation from the welding arc thereon, and a circuit for producing a voltage which varies with the ultraviolet radiation produced by the arc plasma, which voltage is compared to a reference voltage to produce an error voltage which controls the positioning of the electrode so that the ultraviolet radiation intensity of the welding arc is held substantially constant during the welding operation.

A further feature of the invention is the provision of a positioning system for a nonconsumable welding electrode, including a support for the infrared and visible light radiation intensity measuring photo diode and for apparatus for guiding the radiation thereto, which engages the work piece and holds the electrode at a constant distance and a constant viewing angle with respect to the arc, for direct guidance of the radiation from the welding arc to the photo diode. Radiation may be similarly directed on an ultraviolet sensor by guiding apparatus engaging the work piece and at a constant distance and a constant angle with respect to the welding arc.

The invention is illustrated in the drawings wherein:

FIG. 2 illustrates the arc produced by the tungsten electrode and the sensor for ultraviolet radiation therefrom;

FIG. 3 illustrates a flexible light bundle for sensing infrared radiation; and

FIG. 4 is a cross section along the lines 4—4 of FIG. 3.

Figure 1:
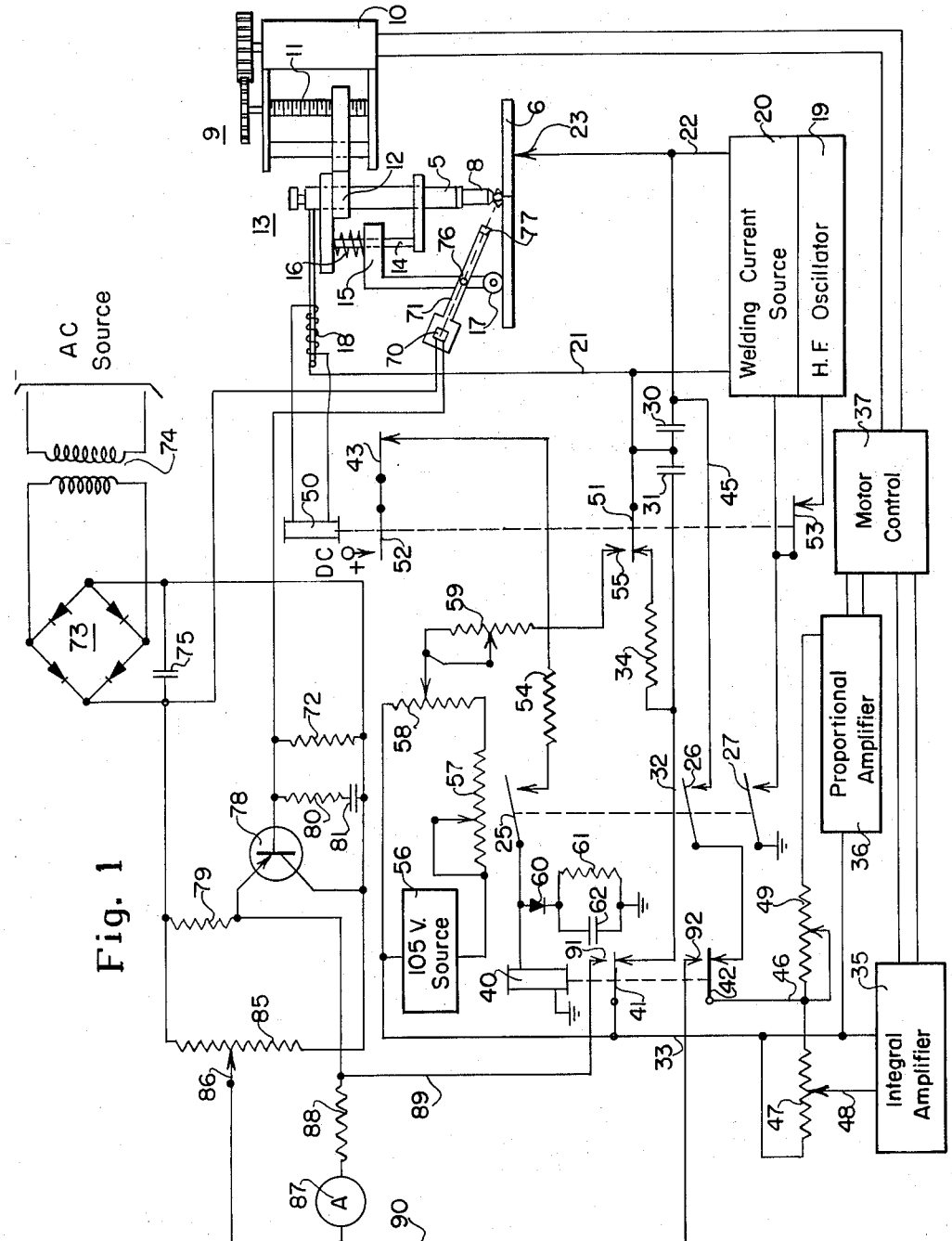
FIG. 1 is a schematic diagram of the welding control system of the invention.

In practicing this invention, there is provided a welding system having an automatic welding head which supports the welding torch, with a nonconsumable electrode which may be made of tungsten in the torch. The electrode is positioned by a motor in the automatic head, with the motor being operated by a control system. A welding current source is connected between the welding torch electrode and the work piece and an inert gas is applied to the welding arc and molten metal. The welding arc between the electrode and the work piece is ignited by means of a high frequency oscillator included in the welding system. After the arc is ignited, the voltage between the electrode and the work piece is balanced against a reference voltage to control the electrode position to hold the arc voltage constant. After a time delay, an arc radiation sensing unit is rendered operative. This may be a photo diode for infrared and visible light sensing, or an ultraviolet sensor which views the welding arc. The signal produced by the arc radiation sensing unit is amplified to produce a voltage representing the arc radiation intensity. When the arc gets longer, more radiation is provided to increase the control voltage, and when the arc gets shorter, less radiation is provided to decrease the control voltage. This arc radiation control voltage is balanced against a second reference voltage to provide a second error signal for controlling an integral amplifier and a proportional amplifier. The second error signal replaces the first error signal after a predetermined time delay, and thereafter controls the position of the electrode so that the welding arc radiation remains substantially constant.

As the ultraviolet light radiated by the plasma is a more direct indication of the welding action of the arc, it may be preferable to sense this portion of the arc. However, the infrared and visible light radiation is somewhat easier to guide and sense, and in certain applications it may be preferable to sense this radiation.

FIG. 1 shows the welding control system of the invention, including a welding torch 5 for providing a weld on work piece 6. The torch 5 operates with a nonconsumable electrode 8 which may be made of tungsten. The torch 5, with the electrode 8, is positioned over the work piece 6 by the automatic head mechanism 9, operated by motor 10. The motor 10 operates through gears to drive threaded shaft 11. The torch support 12 has a threaded portion engaging shaft 11 to move the electrode 8 with respect to the work piece to adjust the arc length. Current is applied between the electrode and the work piece from a welding constant current source 20. A high frequency oscillator 19 is coupled to the source 20 to provide high frequency oscillations for arc ignition. The source 20 and high frequency oscillator 19 are connected through conductor 21 to the welding electrode 8, and through conductor 22 to a contact 23 in engagement with the work piece 6.

The welding torch 5 includes provisions for applying an inert gas about the tungsten electrode to the welding arc. Gasses such as helium and argon may be used.

Operation of the welding system is initiated by operation of switch 25 which may be gauged with switches 26 and 27. These switches may be mechanically connected, or coupled through a relay whereby operation of start switch 25 causes the various switches to close. Switch 27 operates to energize the welding current source 20 so that a voltage of the order of 80 volts is applied between the welding electrode and the work piece, and at the same time, it operates the high frequency oscillator 19 which provides a burst of high frequency which ignites the arc. The current applied through the welding electrode will be sensed by the current sensing coil 18 to cause operation of the current sensing relay 50. This will cause contact 51 to move to open the short circuit across capacitor 31, and to engage contact 55 to apply a reference voltage to capacitor 31. At the same time contact 53 will open to de-energize high frequency oscillator 19 to stop the flow of high frequency to the welding arc. The voltage which is applied between the welding electrode and the work piece charges capacitor 30 which is connected across the welding current source. Capacitor 30, together with capacitor 31, provide an error signal which controls the motor 10 and the position of the electrode 8, through the mechanism 9. This action takes place through the operation of integral amplifier 35, proportional amplifier 36 and motor control system 37. These elements may operate as described in the copending patent application of Marcel R. Sommeria, Serial No. 193,077, filed May 4, 1962.

The error signal produced by capacitors 30 and 31 provides control of the system by comparing the voltage between the electrode 8 and work piece 6, which is developed across capacitor 30, to a reference voltage which is applied to capacitor 31. Capacitor 31 is connected through conductor 32 and contact 41 of relay 40 to conductor 33 which is connected to both integral amplifier 35 and proportional amplifier 36. Capacitor 30 is connected through conductor 45, switch 26, and contact 42 of relay 40 to conductor 46. Potentiometer 47 is connected between conductors 33 and 46, and has a movable tap 48 connected to integral amplifier 35. The movable tap 48 is set to select the desired proportion of the error signal for proper operation of the integral amplifier 35. Conductor 46 is connected through variable resistor 49 to the proportional amplifier 36 and provides the error signal thereto, with resistor 49 providing a sensitivity control.

When the system is started by operation of switch 25, and the high frequency ignites the arc, the voltage between the electrode and the work piece is applied across capacitor 30, and the reference voltage is applied to capacitor 31, and the difference between these voltages establishes the error signal which controls the position of the electrode.

The welding arc can be ignited without the help of high frequency oscillator 19. The operation of the switch 25 then, as before, produces the open circuit voltage which will be applied across capacitor 30. Capacitor 31 is shorted by contact 51 of relay 50 and resistor 34 so that there is essentially no voltage across this capacitor, and the voltage applied to the integral amplifier and the proportional amplifier results entirely from the voltage across capacitor 30. This voltage will cause the motor to move the electrode 41 until it engages the work piece 12. This will short the capacitor 30 so that the voltage thereacross will drop, and this will stop the motion. The current applied through the welding rod will be sensed by the current sensing coil 18 on the welding gun to cause operation of the current sensing relay 50. This will cause contact 51 to move to open the short circuit across capacitor 31, and to engage contact 55 to apply a reference potential to capacitor 31.

The voltage appearing on contact 55 is derived from regulated source 56, and is connected through calibrating resistor 57 to potentiometer 58. The desired portion of this voltage is derived from the movable tap on potentiometer 58 and applied through variable resistor 59 to the contact 55. This voltage is applied to capacitor 31 when the contact 51 is moved to the dotted position by actuation of relay 50. As the voltage across capacitor 30 is zero, the voltage across capacitor 31 is applied to the amplifiers 35 and 36, and causes the motor to reverse and retract the electrode so that the arc is initiated.

Operation of current sensing relay 50 closes contact 52 thereof to provide a connection from the D.-C. potential through closed contact 43, resistor 54, and closed switch contact 25 to a delay network including diode 60, resistor 61 and capacitor 62. Contact 43 may be used to stop the system, and may be operated by a relay or any suitable control means. Relay 40 is connected across the delay network, and is energized after the predetermined time delay. When relay 40 is energized, contacts 41 and 42 thereof are moved to the upper dotted positions to disconnect the capacitors 30 and 31 from the integral amplifier and the proportional amplifier. Accordingly, the control based on the voltage between the electrode and the work piece is now disconnected, and control is accomplished through the radiation sensitive control.

The arc radiation intensity sensor may be a photo diode which responds to the infrared and visible radiation, or an ultraviolet sensor positioned to sense the illumination of the arc between the electrode 8 and the work piece 6. A system including a photo diode will be described first.

A tubular guiding structure 71 causes the radiation at a predetermined portion of the arc to be directed to the photo diode 70. The photo diode 70 is connected in series with resistor 72 across a direct current source produced by rectifier bridge 73, coupled by transformer 74 to an A.-C. source. Capacitor 75 provides filtering of the direct current. Conduction of the diode 70 controls the current through resistor 72 to thereby control the voltage thereacross. This voltage is applied to the base electrode of transistor 78, which is connected in an emitter follower circuit. The voltage developed across resistor 79, which is connected to the emitter electrode of transistor 78, is proportional to the radiation applied to the photo diode 70. Resistor 80 and capacitor 81, connected across resistor 72, form a filter network to remove transient spikes which may occur from sudden change in radiation from the arc, so that these transients will not affect the operation of the emitter follower, and the voltage which is developed thereby across resistor 79.

Connected in parallel with transistor 78 across the direct current supply is potentiometer 85. This potentiometer has a movable contact 86 which can be set to a reference voltage representing arc length. The difference between the potential at the emitter electrode of transistor 78, and that at contact 86 forms an error signal which represents the deviation of the length of the welding arc from the desired length. When the length deviates, the photo diode 70 will cause more or less current to flow to thereby change the conduction of transistor 78 and change the voltage at the emitter electrode thereof. This error signal may be indicated by ammeter 87 connected in series with resistor 88, across conductors 89 and 90. These conductors which provide the error signal are connected to contacts 91 and 92 of relay 40, so that when the relay 40 is actuated, the error signal is applied to movable contacts 41 and 42.

When relay 40 is actuated, the error signal provided by the light sensitive system is applied between conductors 33 and 46. As previously stated, these conductors apply the potential to the integral amplifier 35 and the proportional amplifier 36 to operate the motor control circuit, which in turn controls the motor 10 to cause torch positioning mechanism 9 to move the electrode. Control is therefore transferred from the constant voltage control system to the radiation sensitive control system which is effective to position the end of the electrode 8 so that the arc radiation intensity is constant.

In order to control the position of the arc radiation sensing unit which includes photo diode 70 and guide tube 71, a positioning mechanism 13 is provided. This mechanism includes a rod 14 mounted on the torch 5, on which is slidably mounted a carrier 15. The carrier is spring biased by coil spring 16 so that roller 17 exerts light pressure on the work piece 6. The rod 14 may be of non-circular cross section, and the carrier may have an opening with a corresponding cross section so that the carrier does not pivot, but can slide up and down. The guide tube 71 may be mounted on carrier 15 by a pivoted connection 76, making it possible to adjust the viewing angle. The end of guide tube 71 may be protected from direct arc heating by an adaptor 77. This structure has been found to position the photo diode and guiding tube so that the distance and angle of viewing remains constant and the radiation is accurately sensed to provide accurate control.

In FIG. 2 there is shown in more detail the arc produced between the electrode 8 and the work piece 6. The work piece is shown as having a joint 7 which is to be united by the welding operation. As previously stated, the arc is formed of a central plasma 100 and a surrounding flame 101. The central plasma produces ultraviolet radiation, and the amount of radiation depends on the length of the plasma portion of the arc. Accordingly, by sensing the ultraviolet radiation and holding it substantially constant, the welding action is held uniform. The surrounding flame portion is formed by radiation from the tungsten electrode which forms the cathode, and from the work piece which forms the anode, to produce an outward flare as shown at 102.

The ultraviolet radiation produced by the central plasma portion of the arc can be sensed by an ultraviolet sensor, shown in FIG. 2 as the bulb 103. Since glass does not effectively transmit ultraviolet radiation, a quartz window 104 is provided at the end of the bulb to allow ultraviolet radiation to strike the electrodes 105 and 106 of the bulb. This bulb may be a standard ultraviolet sensing device which is commercially available. This bulb can be connected in the circuit of FIG. 1 in place of the photo diode 70, and will control the bias applied to the base electrode of transistor 78 to control the voltage across resistor 79. The voltage across resistor 79 will be proportional to the radiation applied to the sensor 103.

As previously stated, the guiding tube for directing radiation onto the sensor may have an adaptor 77 at the end to shield the structure from the intense heat. A restricted opening 107 permits the radiation to enter the tube 71 only from a specific area. When using an ultraviolet sensor, a filter element 108 which passes ultraviolet radiation but blocks the infrared radiation may be used, such as a disc of silicon. This system will therefore in effect see through the flame portion 101 of the arc to the inner plasma portion 100. When used in the system of FIG. 1, this operates to hold the electrode 8 at a substantially constant distance from the work piece.

FIGS. 3 and 4 show a sensor structure which may be used in the system of FIG. 1 with the infrared detector 70. In this case the radiation is guided to the detector by a bundle 110 of glass fibers. The fibers may be supported from carrier 15 by a rigid tube 111 so that the ends thereof are held in fixed positions with respect to the flame of the arc. The glass fibers in the bundle 110 are surrounded by a flexible tube 112 which extends from the rigid tube 111. This permits positioning the photo diode 70 remotely from the arc and provides flexibility in the construction of the control system.

The welding control system described has been found to be very effective to provide constant welding action. The system using an ultraviolet sensor has the advantage that the radiation from the central plasma portion of the welding arc which is sensed is an accurate measure of the welding action. However, the sensor responsive to infrared radiation at a particular part of the welding arc has been found to provide quite constant welding action by controlling the position of the electrode so that the radiation which is sensed remains constant.

We claim:

1. In a welding system of the type in which a non-consumable welding electrode is held in a position adjacent to a work piece to produce an arc therebetween, and wherein the electrode is held in a welding torch which is supported by an automatic welding head having driving means for positioning the electrode in accordance with an error voltage applied thereto, the combination including, first and second voltage supply means for producing first and second reference voltages, control means responsive to the arc voltage between the welding electrode and the work piece for producing a first error voltage representing the difference of said arc voltage from said first reference voltage, radiation sensing means responsive to the intensity of the welding arc radiation for producing a voltage which varies with such radiation, said radiation sensing means including a portion in engagement with the work piece to position said sensing means with respect to the welding arc, means producing a second error voltage representing the difference of said voltage produced by said sensing means from said second reference voltage, and switch means for initially applying said first error voltage to said driving means, said switch means including time delay means causing operation of said switch means to apply said second error voltage to said driving means after a predetermined time.

2. A welding system including in combination, a nonconsumable welding electrode, positioning means for holding said electrode in a position adjacent a work piece, welding current supply means for energizing said electrode including high frequency current supply means coupled to said electrode to prepare an electrical path for the welding current flow to produce a welding arc between the end of said electrode and the work piece, driving motor means for operating said positioning means to change the position of said electrode, control means for causing operation of said driving motor means in accordance with an error voltage applied thereto, voltage supply means providing first and second reference voltages, control means responsive to the voltage across the welding arc for producing a first error signal representing the difference between said arc voltage and said first reference voltage, radiation sensitive means responsive to the radiation intensity of the welding arc for producing a voltage which varies with said radiation, means producing a second error signal representing the difference between said voltage produced by said radiation sensitive means and said second reference voltage, and switch means for starting said welding system and applying said first error signal to said control means, said switch means including time delay means operating a predetermined time after starting of said welding system for operating said switch means to apply said second error signal to said control means.

3. In a welding system of the type in which a nonconsumable welding electrode is held in a position adjacent to a work piece to produce an arc therebetween, and wherein the electrode is held in a welding torch which is supported by an automatic welding head having driving means for positioning the electrode in accordance with an error voltage applied thereto, the combination including, first and second voltage supply means for producing first and second reference voltages, control means responsive to the arc voltage between the welding electrode and the work piece for producing a first error voltage representing the difference of said arc voltage from said first reference voltage, radiation sensing means responsive to the intensity of the welding arc radiation for producing a voltage which varies with such radiation, said radiation sensing means including a carrier having a portion in engagement with the work piece and spring means holding said portion against the work piece, a sensing element and guiding means for supporting said element and directing radiation thereon, and means supporting said guiding means on said carriage to position said guiding means with respect to the welding arc, circuit means producing a second error voltage representing the difference of said radiation voltage from said second reference voltage, and switch means for initially applying said first error voltage to said driving means, said switch means including time delay means causing operation of said switch means to apply said second error voltage to said driving means after a predetermined time.

4. In a welding system of the type in which a nonconsumable welding electrode is held in a position adjacent to a work piece to produce an arc therebetween, and wherein the electrode is held in a welding torch which is supported by an automatic welding head having driving means for positioning the electrode in accordance with an error voltage applied thereto, the combination including, voltage supply means for producing a reference voltage, radiation sensing means responsive to the intensity of the welding arc radiation for producing a control voltage which varies with such radiation, said radiation sensing means including a carrier having a portion in engagement with the work piece and resilient means holding said portion against the work piece, a radiation sensing element and guiding means for directing radiation on said element, and pivotal means supporting said guiding means on said carrier to position said guiding means with respect to the arc, and control means coupled to said sensing means and to said voltage supply means for producing an error voltage representing the difference of said control voltage from said reference voltage, said control means applying said error voltage to said driving means for positioning the welding electrode.

5. In a welding system of the type in which a nonconsumable welding electrode is held in a position adjacent to a work piece to produce an arc therebetween, and wherein the electrode is held in a welding torch which is supported by an automatic welding head having driving means for positioning the electrode in accordance with an error voltage applied thereto, the combination including, voltage supply means for producing a reference voltage, radiation sensing means responsive to the intensity of the ultraviolet radiation of the welding arc for producing a control voltage which varies with such radiation, said radiation sensing means including a carrier having a portion in engagement with the work piece and resilient means holding said portion against the work piece, an ultraviolet sensing element and guiding means for supporting said element and directing radiation thereon, and pivotal means supporting said guiding means on said carrier to position said guiding means with respect to the arc, and control means coupled to said sensing means and to said voltage supply means for producing an error voltage representing the difference of said control voltage from said reference voltage, said control means applying said error voltage to said driving means for positioning the welding electrode.

6. In a welding system of the type in which a nonconsumable welding electrode is held in a position adjacent to a work piece to produce an arc therebetween, and wherein the electrode is held in a welding torch which is supported by an automatic welding head having driving means for positioning the electrode in accordance with an error voltage applied thereto, the combination including, voltage supply means for producing a reference voltage, radiation sensing means responsive to the intensity of the infrared radiation of the welding arc for producing a control voltage which varies with such radiation, said radiation sensing means including a carrier having a portion in engagement with the work piece and resilient means holding said portion against the work piece, an infrared sensing element and guiding means for directing radiation on said element, and pivotal means supporting said guiding means on said carrier to position said guiding means with respect to the arc, and control means coupled to said sensing means and to said voltage supply means for producing an error voltage representing the difference of said control voltage from said reference voltage, said control means applying said error voltage to said driving means for positioning the welding electrode.

7. In welding apparatus of the type in which a nonconsumable welding electrode is held in a welding torch which is supported by an automatic welding head in a position adjacent a work piece, and which welding head includes drive means for positioning the electrode in accordance with a control voltage applied thereto, the combination including, voltage supply means providing a first reference voltage, control means coupled to the electrode and responsive to the voltage across the arc for producing a first error signal representing the difference between said arc voltage and said first reference voltage, voltage supply means providing a second reference voltage, arc radiation sensing means including a photo diode responsive to infrared radiation produced by the arc, said sensing means including a guiding tube and means for holding the same at a constant distance from the work piece and at constant viewing angle with respect to the arc, a transistor circuit coupled to said photo diode and providing a control voltage which varies with the radiation intensity applied to said photo diode, circuit means producing a second error signal representing the difference between said control voltage produced by said transistor circuit and said second reference voltage, and switch means for starting said welding apparatus and applying said first error signal to said drive means, said switch means including time delay means operating a predetermined time after starting of said welding apparatus for operating said switch means to apply said second error signal to said drive means.

8. In welding apparatus of the type in which a non-consumable welding electrode is held in a welding torch which is supported by an automatic welding head in a position adjacent a work piece, and which welding head includes drive means for positioning the electrode in accordance with a control voltage applied thereto, the combination including, voltage supply means providing a first reference voltage, control means coupled to the electrode and responsive to the voltage across the arc for producing a first error signal representing the difference between said arc voltage and said first reference voltage, voltage supply means providing a second reference voltage, arc radiation sensing means including a photo diode responsive to infrared radiation produced by the arc, said sensing means including a plurality of glass fibers each having one end positioned adjacent said photo diode, means for holding the other ends of said glass fibers at a constant distance from the work piece and at constant viewing angle with respect to the arc, a transistor circuit coupled to said photo diode and providing a control voltage which varies with the radiation intensity applied to said photo diode, circuit means producing a second error signal representing the difference between said control voltage produced by said transistor circuit and said second reference voltage, and switch means for starting said welding apparatus and applying said first error signal to said drive means, said switch means including time delay means operating a predetermined time after starting of said welding apparatus for operating said switch means to apply said second error signal to said drive means.

9. In welding apparatus of the type in which a non-consumable welding electrode is held in a welding torch which is supported by an automatic welding head in a position adjacent to a work piece, and which welding head includes drive means for positioning the electrode in accordance with a control voltage applied thereto, the combination including, voltage supply means providing a first reference voltage, control means coupled to the electrode and responsive to the voltage across the arc for producing a first error signal representing the difference between said arc voltage and said first reference voltage, means providing a second reference voltage, arc radiation sensing means responsive to the ultraviolet radiation produced by the arc, said radiation sensing means including an ultraviolet sensor, a guiding tube for directing radiation on said sensor, and means for positioning said ultraviolet sensor and said guiding tube at a constant distance from the work piece and at a constant viewing angle with respect to the arc, a transistor circuit coupled to said ultraviolet sensor and providing a control voltage which varies with the radiation intensity applied to said ultraviolet sensor, means producing a second error signal representing the difference between said control voltage produced by said transistor circuit and said second reference voltage, and switch means for starting said welding apparatus and applying said first error signal to said drive means, said switch means including time delay means operating a predetermined time after starting of said welding apparatus for operating said switch means to apply said second error signal to said drive means.

References Cited by the Examiner

UNITED STATES PATENTS

| | | | |
|---|---|---|---|
| 2,031,288 | 2/1936 | Tripp | 314—63 X |
| 2,089,015 | 8/1937 | Bucknam et al. | 219—135 X |
| 2,223,177 | 11/1940 | Jones | 314—63 |
| 2,476,808 | 7/1949 | Brubaker | 314—64 X |
| 2,662,991 | 12/1953 | Gretner | 314—63 X |
| 3,209,121 | 9/1965 | Manz | 219—125 X |

RICHARD M. WOOD, *Primary Examiner.*

J. V. TRUHE, *Assistant Examiner.*